United States Patent
Taras et al.

(10) Patent No.: US 8,096,139 B2
(45) Date of Patent: Jan. 17, 2012

(54) REFRIGERANT SYSTEM WITH VARIABLE SPEED DRIVE

(75) Inventors: Michael F. Taras, Fayetteville, NY (US); Alexander Lifson, Manlius, NY (US)

(73) Assignee: Carrier Corporation, Farmington, CT (US)

(*) Notice: Subject to any disclaimer, the term of this patent is extended or adjusted under 35 U.S.C. 154(b) by 537 days.

(21) Appl. No.: 12/083,704

(22) PCT Filed: Oct. 17, 2005

(86) PCT No.: PCT/US2005/037464
§ 371 (c)(1),
(2), (4) Date: Apr. 17, 2008

(87) PCT Pub. No.: WO2007/046794
PCT Pub. Date: Apr. 26, 2007

(65) Prior Publication Data
US 2009/0255278 A1    Oct. 15, 2009

(51) Int. Cl.
F25D 17/00 (2006.01)
(52) U.S. Cl. .......... 62/179; 62/228.4; 417/5; 417/6
(58) Field of Classification Search .......... 62/179, 62/180, 228.1, 228.4, 236; 417/2, 5, 6, 42, 417/45
See application file for complete search history.

(56) References Cited

U.S. PATENT DOCUMENTS

| | | | | |
|---|---|---|---|---|
| 4,566,289 A * | 1/1986 | Iizuka et al. | ............ | 62/228.4 |
| 5,746,062 A | 5/1998 | Beaverson et al. | ........ | 62/228.3 |
| 5,797,729 A * | 8/1998 | Rafuse et al. | ............ | 417/3 |
| 5,823,004 A * | 10/1998 | Polley et al. | ............ | 62/179 |
| 6,116,040 A | 9/2000 | Stark | ............ | 62/259.2 |
| 6,237,353 B1 | 5/2001 | Sishtla et al. | ............ | 62/259.2 |
| 6,370,888 B1 | 4/2002 | Grabon | ............ | 62/115 |
| 6,560,980 B2 * | 5/2003 | Gustafson et al. | ............ | 62/186 |
| 6,579,067 B1 * | 6/2003 | Holden | ............ | 417/2 |
| 6,659,726 B2 * | 12/2003 | Holden | ............ | 417/2 |
| 6,688,124 B1 | 2/2004 | Stark et al. | ............ | 62/222 |
| 7,836,713 B2 * | 11/2010 | Lifson et al. | ............ | 62/179 |
| 2004/0252423 A1 * | 12/2004 | Boren | ............ | 361/23 |
| 2005/0035664 A1 * | 2/2005 | Zver et al. | ............ | 307/115 |
| 2005/0189888 A1 * | 9/2005 | Federman et al. | ............ | 318/67 |
| 2005/0189889 A1 * | 9/2005 | Wirtz et al. | ............ | 318/105 |
| 2005/0190511 A1 * | 9/2005 | Crane et al. | ............ | 361/23 |
| 2005/0223724 A1 * | 10/2005 | Crane et al. | ............ | 62/175 |

(Continued)

FOREIGN PATENT DOCUMENTS

CN     1222665     7/1999

(Continued)

OTHER PUBLICATIONS

JP04-308377_Abstract.*

(Continued)

*Primary Examiner* — Cheryl J Tyler
*Assistant Examiner* — Paolo Gonzalez
(74) *Attorney, Agent, or Firm* — Cantor Colburn LLP

(57) ABSTRACT

A refrigerant system (10, 100, 200) is provided with a power control system (30, 130, 230). The power control system adjusts the speed of the motors driving the refrigerant system components such as a compressor, a fan or a pump via a variable speed device (75, 175, 275) or bypasses the variable speed device (75, 175, 275) for normal operating speeds. A single power control system may be provided for the entire refrigerant system or each component may be independently controlled.

12 Claims, 3 Drawing Sheets

U.S. PATENT DOCUMENTS

2006/0130501 A1 * 6/2006 Singh et al. ............... 62/183

FOREIGN PATENT DOCUMENTS

| CN | 1375665 | | 10/2002 |
|---|---|---|---|
| JP | 04-308377 | * | 10/1992 |
| JP | 2006-271071 | * | 10/2006 |

OTHER PUBLICATIONS

JP2006271071__Abstract.*
International Search Report issued Mar. 15, 2006 for the corresponding international application PCT/US2005/037464.

* cited by examiner

US 8,096,139 B2

REFRIGERANT SYSTEM WITH VARIABLE SPEED DRIVE

BACKGROUND OF THE INVENTION

1. Field of the Invention

This invention generally relates to machinery driven by variable speed drives and, more particularly, to systems for heating, ventilation, air-conditioning and refrigeration applications with variable speed components.

2. Description of the Related Art

In machinery that is driven by variable speed drives, there is approximately a five to ten percent penalty in power and efficiency due to losses associated with the operation of the variable speed drive. This efficiency loss or additional power draw is one of the drawbacks that has limited the application of variable speed drives in industrial or other installations. This limitation is especially significant where the need to slow down or speed up the machinery from its normal operating speed is infrequent.

Further, variable speed drive electronics generate heat and are frequently required to be cooled with an external source and/or by diverting a portion of refrigerant circulating through the refrigerant system. Therefore, additional efficiency and power draw penalties are paid to operate variable speed drives within the specified temperature limits. Also, variable speed drives often present a source of unreliability reducing overall system maintenance and uninterrupted service intervals.

Accordingly, there is a need for heating, ventilation, air-conditioning and refrigeration systems with the components driven at variable speeds (or incorporating variable speed drives) with enhanced efficiency of the operation and improved reliability. The method and apparatus of the present invention reduces losses associated with the operation of variable speed drives.

It is an object of the present invention to provide a system for heating, ventilation, air-conditioning and refrigeration applications with an enhanced operational efficiency and improved reliability.

It is a further object of the present invention to provide such a system with an increased service life and maintenance intervals for the components of the variable speed drive system.

It is yet a further object of the present invention to provide a configuration that allows for selective operation of the variable speed drive system.

SUMMARY OF THE INVENTION

In one aspect, a power control system for a refrigerant system having an AC motor with a normal operating speed is provided. The power control system comprises a variable frequency drive connected to the AC motor, and a bypass device connected to the AC motor and connectable to a power source. The bypass device is selectively switchable between first and second positions. The first position provides connection from the power source to the variable frequency drive thereby causing the AC motor to run at lower or higher than the normal operating speed. The second position provides connection from the power source to the AC motor by bypassing the variable frequency drive thereby causing the AC motor to run at the normal operating speed.

In another aspect, a refrigerant system is provided, which comprises a vapor compression system and a power control system. The vapor compression system includes a compressor with a compressor motor. The power control system includes a variable speed drive device and a bypass device. The bypass device is connected to the compressor motor and is connectable to a power source. The bypass device is selectively switchable between first and second positions. The first position provides connection from the power source to the variable speed drive device thereby causing the compressor motor to run at lower or higher than a normal operating speed. The second position provides connection from the power source to the compressor motor by bypassing the variable speed drive device thereby causing the compressor motor to run at the normal operating speed.

In yet another aspect, a method of operating a refrigerant system to meet space thermal load demands is provided. The method comprises providing a vapor compression system having a compressor with an AC motor, determining if the AC motor need to run at below or above a normal operating speed to satisfy the space thermal load demands, reducing or increasing a speed of the AC motor accordingly below or above the normal operating speed to satisfy the space thermal load demands, wherein the speed is varied by adjusting the frequency and/or voltage of power supplied to the AC motor via a variable frequency drive, and providing power to the AC motor by bypassing the variable frequency drive if the space thermal load demands are to be satisfied by running the AC motor at the normal operating speed.

The variable speed drive device can be a variable frequency drive and the motor may be an AC motor. The variable speed drive device can be a voltage control module and the motor may be a DC motor. The bypass device can comprise a two-position switch and a bypass circuit. The bypass circuit may be connected between the variable speed drive device and the power source for providing the connection directly to the motor. The vapor compression system typically has at least a condenser, an expansion device, and evaporator, where a condenser and evaporator have fans with fan motors. The fan motors may be connected to the bypass device, wherein the first position of the bypass device provides connection from the power source to the variable speed drive device thereby causing the fan motor to run at lower or higher than a normal operating speed, and wherein the second position of the bypass device provides connection from the power source to the fan motor by bypassing the variable speed drive device thereby allowing the fan motor to run at the normal operating speed. The method can further comprise monitoring parameters of the refrigerant system to determine the space thermal load imposed upon the refrigerant system. Also, each of the fans may have a separate power control system increasing operational flexibility, if desired. Further, variable speed liquid pumps may be used in place of fans in a similar manner but to circulate liquid (instead of air) through condensers and evaporators.

The above-described and other features and advantages of the present disclosure will be appreciated and understood by those skilled in the art from the following detailed description, drawings, and appended claims.

The above-described and other features and advantages of the present disclosure will be appreciated and understood by those skilled in the art from the following detailed description, drawings, and appended claims

DETAILED DESCRIPTION OF THE INVENTION

Figure 1:
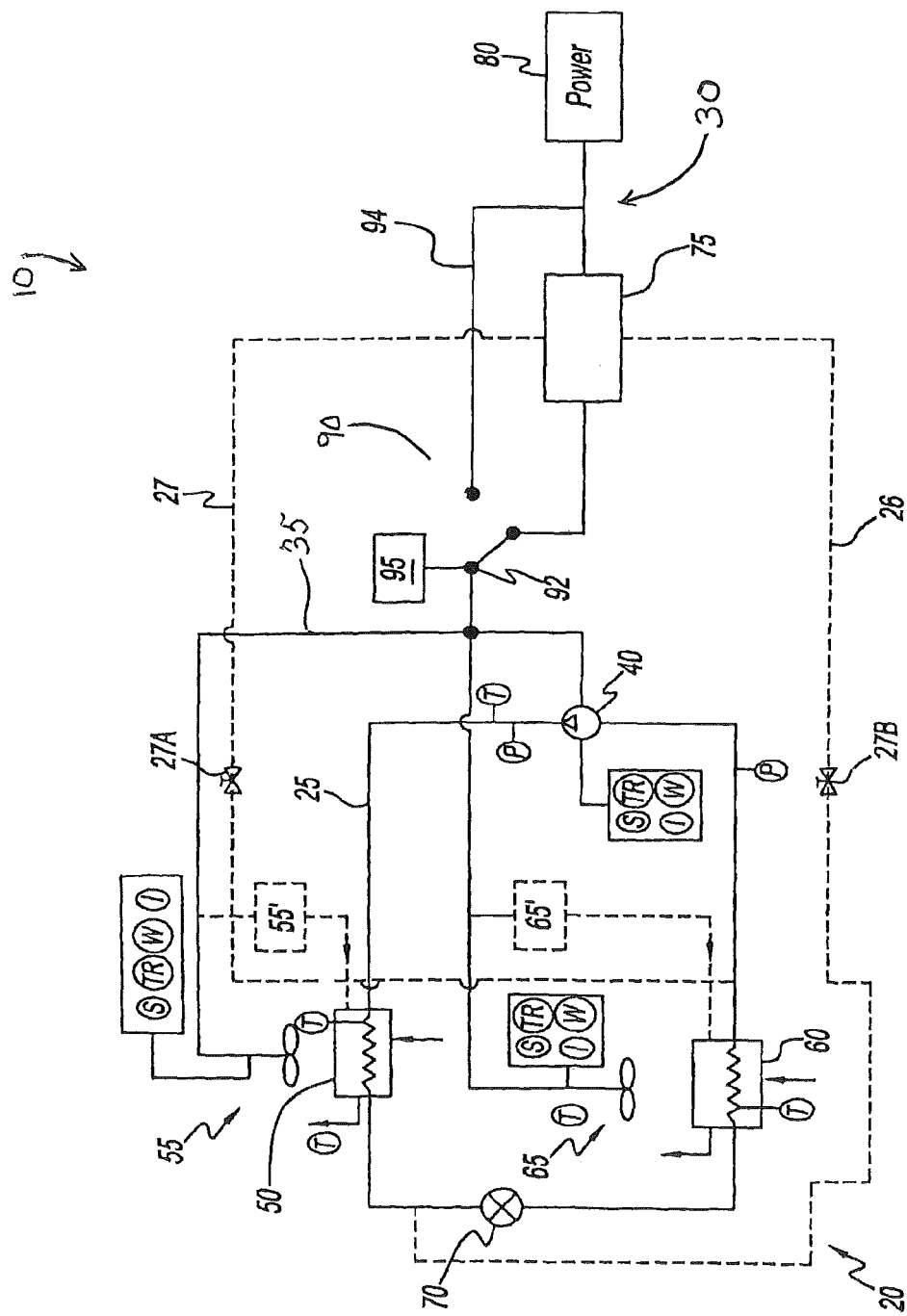
FIG. 1 is a schematic illustration of a refrigerant system with an exemplary embodiment of a power control system of the present invention.

Referring to FIG. 1, an exemplary embodiment of a system having machinery driven by variable speed drives is illustrated and generally referred to by reference numeral 10. The exemplary embodiment of system 10 is a refrigerant system. It should be understood by a person of ordinary skill in the art that the particular type of the refrigerant system 10 can be varied including (but not limited to) heating, ventilation, air-conditioning and refrigeration systems, and the particular components of the system can be changed to accomplish the specific space conditioning objective. Such refrigerant system components are known by a person of ordinary skill in the art. For instance, fans moving air across the condenser and evaporator could be replaced by pumps circulating liquid, such as, for example, water or brine, for heat transfer purposes.

Refrigerant system 10 has a vapor compression system 20 and a power/control system 30. The vapor compression system 20 includes typical components for achieving desired characteristics in the conditioned space including a refrigerant circuit 25 with various valves and interconnected pipes. The vapor compression system 20 includes a compressor 40, a condenser 50, and an evaporator 60 interconnected in the circuit 25. In the exemplary embodiment, fans 55 and 65 are in fluid communication with the condenser 50 and the evaporator 60, respectively, and an expansion device 70 is positioned between the condenser and evaporator within the circuit 25. However, the particular configuration and components of the vapor compression system 20 (including the configuration of refrigerant circuit 25) can be varied according to particular requirements imposed on system 10.

The power/control system 30 provides electric power for driving the components, e g, compressor 40 and/or fans 55 and 65, as well as control over one or more of the components of vapor compression system 20. Power/control system 30 has a variable frequency drive 75 ("VFD") that is connected to the AC motor of compressor 40 and which is also connected to a power source 80 via electric circuit 35. A power bypass device 90 is provided between VFD 75 and power source 80. In the exemplary embodiment of system 10, the power bypass device 90 is a two-position switch 92 and a bypass circuit 94. However, the present disclosure contemplates the use of other structures, devices, circuits and/or methods for selectively providing power to VFD 75 or alternatively bypassing the VFD 75 and providing the power directly to the motor of compressor 40.

VFD 75 adjusts the speed of the motor of compressor 40 by varying the frequency and/or voltage of the power provided to the motor. The power electronics used to adjust or control the frequency and voltage via VFD 75 are known in the art, such as, for example, rectifiers and inverter bridges, and can be varied according to the particular needs of system 10. This adjustment allows the motor of compressor 40 to run at lower or higher than normal operating speed. For instance, such a speed adjustment will improve system performance under circumstances when thermal load in the conditioned space or environmental conditions for the refrigerant system change or a user alters the conditioned space setpoint. However, when compressor 40 is required to operate at its normal speed to meet sensible and latent capacity demands, then the use of VFD 75 incurs efficiency losses and additional power draw, e g, the above-mentioned losses associated with operation of the VFD power electronics and losses associated with cooling of VFD to operate within specified temperature limits. For use of compressor 40 at the normal operating speed, power bypass device 90 provides the power directly to the compressor motor, thus excluding VFD 75 from an electric circuit and improving operational efficiency and reliability of the refrigerant system.

The selective control or switching of the bypass device 90 can be accomplished by various methods and/or devices including both automatic and manual bypassing. In an exemplary embodiment, bypass device 90 is operated by a control system 95 that determines whether the motor of compressor 40 is, or will be, operating at its normal operating speed to satisfy the space thermal load demands, and opens or closes the two-position switch 92 or other bypass device based upon that determination. The opening or closing of the two-position switch 92 or other bypass device can be done by various actuators, devices and methods known in the art, and control system 95 can be a subsystem or subroutine of the overall control system for refrigerant system 10. Alternatively, the opening or closing of the two-position switch 92 can be done manually, and control system 95 can provide a readable indication that compressor 40 will be operating at a normal operating speed to satisfy the space thermal load demands.

Sensors are disposed in various positions throughout the vapor compression system 20 to monitor operational parameters of the system. The data or information gathered by the sensors can be utilized for the control or switching of the bypass device 90, e g, by control system 95 for the opening or closing of the two-position switch 92 The sensors include, but are not limited to, temperature sensors T (e g, temperature transducers), pressure sensors P (e g, pressure transducers), electric current sensors I, power sensors W, torque sensors TR, slip sensors S, transducers for each of these operational parameters, and the like. The use of pressure sensors and saturation temperature sensors are generally interchangeable for refrigerant system 10, since there is a direct relationship between pressure and corresponding saturation temperature. Further, the discharge of the compressor may have a temperature sensor for more refined measurements. The corresponding operational parameters monitored by the sensors can include, but are not limited to, the outdoor and indoor fan motor current, power, torque or slip, the compressor motor current, power, torque or slip, the condenser saturation discharge temperature, evaporator saturation suction temperature, the compressor suction and discharge pressure, and the compressor discharge temperature. The connection or method of communication between the sensors and the bypass device 90, e g, control system 95, is not shown but is known to a person of ordinary skill in the art. The decision when to switch from variable frequency drive to constant speed operation would depend on the information gathered from these sensors. Bypassing of the variable speed device can be based, at least in part, on the efficiency of running at a line frequency as compared to operating at a speed other than provided by the line frequency where there are additional inverter losses. Other considerations such as power limitations, safety concerns and operational reliability may be included into the control logic of control system 95 for making a switching decision. Control system 95 can include other sensors for determining whether the motor of compressor 40 will need to run at normal operating speed to satisfy a space thermal load. Such sensors can monitor various parameters of the system 10, including the ambient temperature and the temperature of the conditioned space.

In the exemplary embodiment of system 10, fans 55 and 65 are also connected to, and controlled via, (bypass device 90.

This allows for selective variable speed control of the fan motors in the same way that the speed of the motor of compressor 40 is adjusted by VFD 75. The fans 55 and 65 can also be directly provided with power via bypass device 90 when they are operating at, or will be operating at, normal operating speed to avoid the efficiency losses associated with the VFD 75.

Due to the heat generated by the power electronics of VFD 75, vapor compression system 20 can also provide cooling to the VFD via refrigerant lines 27 (as shown by the dashed lines). Refrigerant line 26 taps a portion of refrigerant from the main refrigerant circuit 25 downstream of the condenser 50 and returns it through line 27 downstream of the evaporator 60 and may include valves 27A and 27B each of which could be of an adjustable type. The refrigerant lines 26 and 27 supply a portion of the refrigerant from the main refrigerant circuit 25 to the VFD 75 for removal of heat from the electronics of the VFD and then return the refrigerant to the main refrigerant circuit 25. Other locations of lines 26 and 27 in relation to the main refrigerant circuit 25 are also feasible. Additionally, variations can be made to the particular configuration and components of the power-control system 30 (including the configuration of electric circuit 35) according to the particular requirements imposed on refrigerant system 10. Analogously, similar design and control methodology can be applied if a liquid pump 55' or 65' (shown in phantom) is used for heat transfer interaction in vapor compression system 20 instead of fan 55 or fan 65 respectively. The VFD of each of the liquid pumps 55' and 65' as well as for fans 55 and 65 could be independently bypassed as well.

Figure 2:
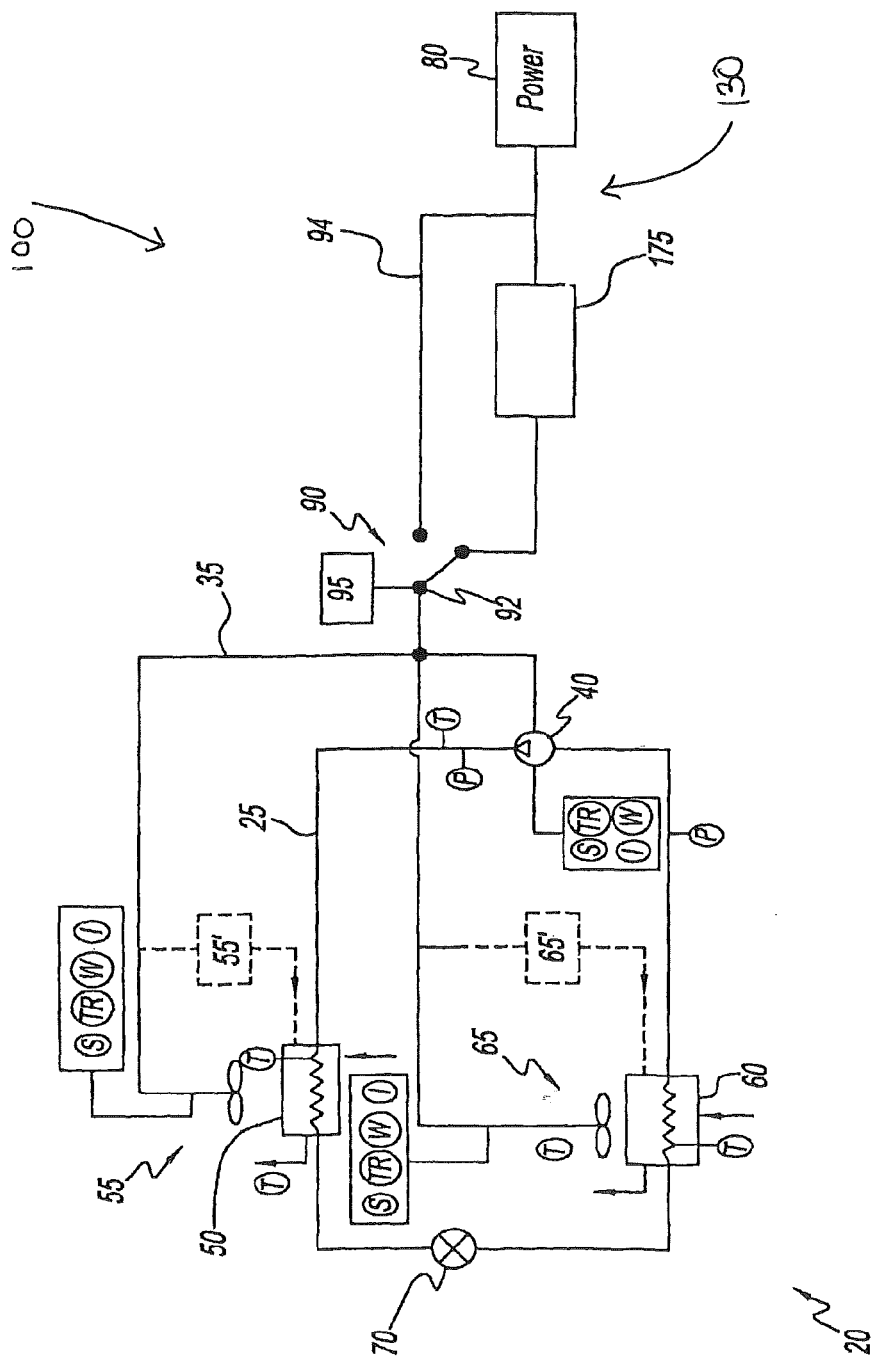
FIG. 2 is a schematic illustration of a refrigerant system with an alternative exemplary embodiment of a power control system of the present invention.

Referring to FIG. 2, an alternative exemplary embodiment of a refrigerant system generally referred to by reference numeral 100 is illustrated. Again, it should be understood by one of ordinary skill in the art that the particular type of the refrigerant system 100 can be varied including (but not limited to) heating, ventilation, air-conditioning and refrigeration, and the particular components of the system can be changed to accomplish the particular objective.

Refrigerant system 100 has components and systems that are similar to the components and systems of refrigerant system 10 of FIG. 1 and which are similarly labeled, such as vapor compression system 20 and its components. Refrigerant system 100 also has a power/control system 130 with components that are similar to the components of power/control system 30 of FIG. 1 and which are similarly labeled. Power/control system 130 provides electric power for driving the components, e g, compressor 40 and fans 55 and 65, as well as control over one or more of the components of the vapor compression system 20. Analogously, identical design and control methodology can be applied if a fluid pump is used instead of fan 55 or fan 65.

Power/control system 130 has a voltage control module 175 ("VCM") that is connected to a DC motor of compressor 40 and also to a power source 80 via electric circuit 35. The power bypass device 90 is provided between VCM 175 and power source 80, which in this alternative exemplary embodiment of system 100 is the two-position switch 92 and the bypass circuit 94. Although, the present disclosure contemplates the use of other structures, devices and/or methods for selectively providing power to VCM 175 or alternatively bypassing the VCM and providing the power directly to the motor of compressor 40.

VCM 175 adjusts the speed of the motor of compressor 40 by varying the voltage of the power provided to the motor. The power electronics used to adjust or control the voltage via VCM 175 are known in the art and can be varied according to the particular needs of system 100. The voltage adjustment by VCM 175 allows the motor of compressor 40 to run at speeds different than its normal operating speed and improve system performance during off-design conditions. The VCM 175 is bypassed when compressor 40 is operating at the normal speed, and electric power is provided directly to the motor of the compressor. This selective control or switching via the bypass device 90 can be accomplished as described above with respect to the exemplary embodiment of system 10, including, but not limited to, the use of control system 95.

The present disclosure contemplates the use of other variable speed drive devices and/or power electronic circuits instead of VFD 75 or VCM 175 which can adjust the speed of AC or DC motors for the compressor 40 and/or other components of the vapor compression system 20, but which can also be bypassed via the bypass device 90 to provide power directly to the motors and avoid efficiency losses when normal operating speed is contemplated. Analogously, similar design and control methodology can be applied if a liquid pump 55' or 65' (shown in phantom) is used with a heat exchanger in vapor compression system 20 instead of fan 55 or fan 65. The VCM of each of the liquid pumps 55' and 65' as well as for fans 55 and 65 could be independently bypassed.

Figure 3:
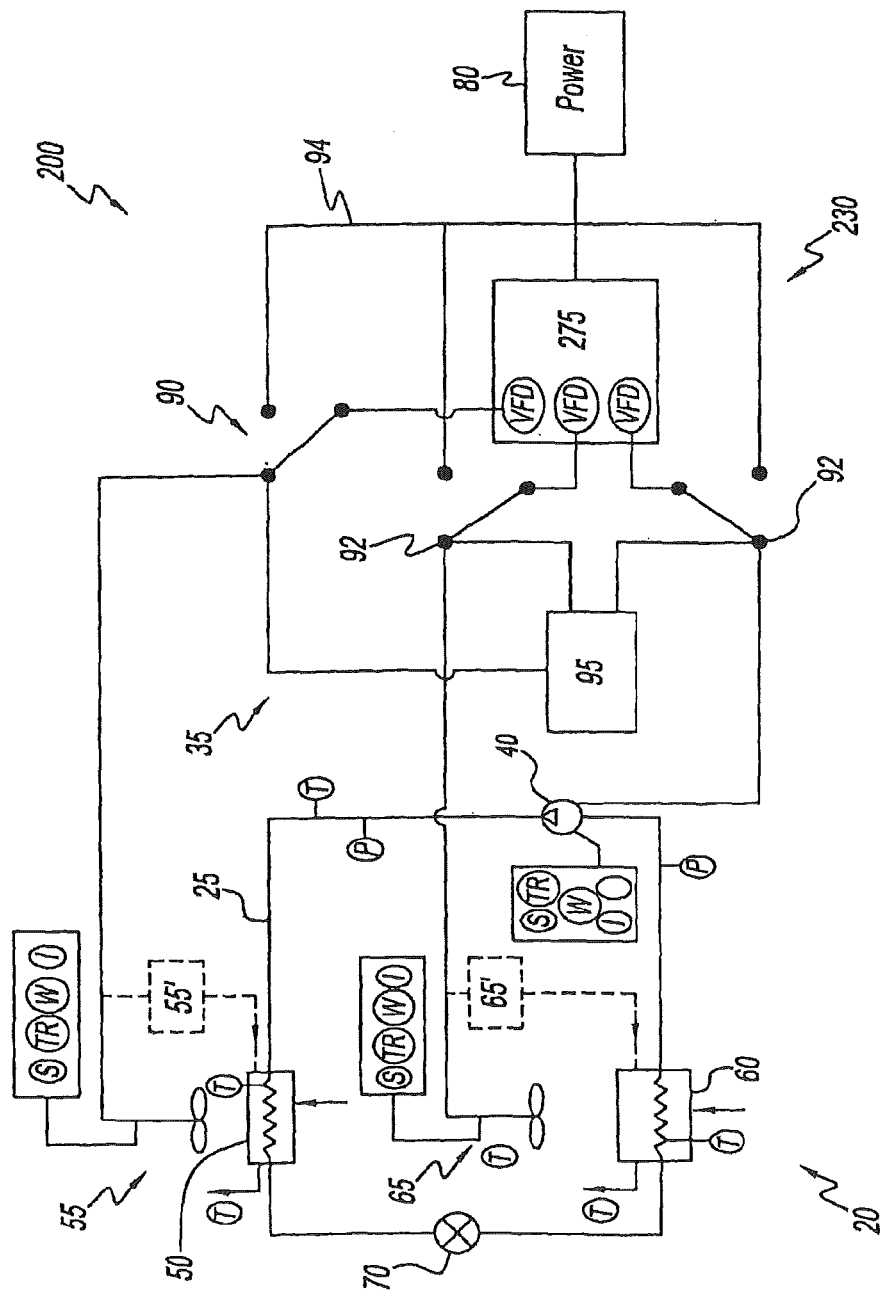
FIG. 3 is a schematic illustration of a refrigerant system with another alternative exemplary embodiment of a power control system of the present invention.

Referring to FIG. 3, another alternative exemplary embodiment of a refrigerant system generally referred to by reference numeral 200 is illustrated. Again, it should be understood by a person of ordinary skill in the art that the particular type of the refrigerant system 200 can be varied including (but not limited to) heating, ventilation, air-conditioning and refrigeration, and the particular components of the system can be changed to accomplish the particular objective.

Refrigerant system 200 has components and systems that are similar to the components and systems of refrigerant system 10, as described above, and which are similarly labeled, such as vapor compression system 20 and its components. Refrigerant system 200 also has a power/control system 230 with components that are similar to the components of power/control system 30 and which are similarly labeled. Power/control system 230 provides electric power for driving the components, e g, compressor 40 and fans 55 and 65, as well as control over one or more of the components of the vapor compression system 20.

Power/control system 230 has a plurality of variable frequency drives 275 that are operated by the system controller. Each of the VFD's are connected to the various components of refrigerant system 20, such as, for example, the motor of compressor 40 and the motors of each of the fans 55 and 65. The power bypass device 90 is provided between VFD's 275 and power source 80, which in this alternative exemplary embodiment of system 200 is the two-position switches 92 and the bypass circuit 94. Although, the present disclosure contemplates the use of other structures, devices and/or methods for selectively providing power to VFD's 275 or alternatively bypassing the VFD's and providing the power directly to the motor of compressor 40 and the motors of fans 55 and 65.

Power/control system 230 can utilize a voltage control module ("VCM"), similar to that described with respect to power/control system 130, that is connected to a DC motor of compressor 40. As mentioned before, system flexibility is increased by providing for independent control of each of the VFD's or VCM's for the various components of the refrigerant system 20. The VFD's or VCM's (or a combination of the two) of each of the components can be independently bypassed or directly powered to increase system operational efficiency and flexibility. Analogously, similar design and control methodology can be applied if a liquid pump 55' or 65' (shown in phantom) is used with a heat exchanger in vapor compression system 20 instead of fan 55 or fan 65. The VFD or VCM of each of the liquid pumps 55' and 65' could be independently bypassed as well.

While the instant disclosure has been described with reference to one or more exemplary embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed as the best mode contemplated for carrying out this invention, but that the invention will include all embodiments falling within the scope of the appended claims.

What is claimed is:

1. A refrigerant system comprising:
    a vapor compression system having:
        a compressor with a compressor motor;
        a condenser;
        an evaporator;
        one of a condenser fan motor and a condenser pump and condenser pump motor; and
        one of an evaporator fan motor and an evaporator pump and evaporator pump motor; and
    a power control system having:
        a variable speed device; and
        a bypass device;
    wherein said bypass device is connected to said compressor motor and to at least one of said condenser fan motor, said evaporator fan motor, said condenser pump motor and said evaporator pump motor, and is connectable to a power source;
    wherein said bypass device is selectively switchable between first and second positions;
    wherein said first position provides electric power from the variable speed device to the compressor motor and the at least one of said condenser fan motor, said evaporator fan motor, said condenser pump motor and said evaporator pump motor thereby causing said compressor motor and the at least one of said condenser fan motor, said evaporator fan motor, said condenser pump motor and said evaporator pump motor to run at speeds different from a normal operating speed, and
    wherein said second position provides electric power from the power source to said compressor motor and the at least one of said condenser fan motor, said evaporator fan motor, said condenser pump motor and said evaporator pump motor by bypassing said variable speed device thereby causing said compressor motor and the at least one of said condenser fan motor, said evaporator fan motor, said condenser pump motor and said evaporator pump motor to run at said normal operating speed;
    wherein the variable speed device comprises a controller that operates the bypass device to bypass the variable speed device based at least in part the controller comparing efficiency of running at line frequency to operating at a speed other than provided by line frequency where there are additional inverter losses.

2. The system of claim 1, wherein said variable speed device is a variable frequency drive, and wherein said compressor motor is an AC motor.

3. The system of claim 1, wherein said variable speed device is a voltage control module, and wherein said compressor motor is a DC motor.

4. The system of claim 1, wherein said bypass device comprises a two-position switch and a bypass circuit, and wherein said bypass circuit is connected between said variable speed device and the power source.

5. The system of claim 1, wherein said variable speed device is a variable frequency drive, and wherein said at least one of said condenser fan motor, said evaporator fan motor, said condenser pump motor and said evaporator pump motor is an AC motor.

6. The system of claim 1, wherein said variable speed device is a voltage control module, and wherein said at least one of said condenser fan motor, said evaporator fan motor, said condenser pump motor and said evaporator pump motor is a DC motor.

7. The system of claim 1, wherein said bypass device comprises a two-position switch and a bypass circuit, and wherein said bypass circuit is connected between said variable speed device and the power source.

8. The refrigerant system of claim 1, further comprising:
    refrigerant cooling lines for tapping a portion of refrigerant from a main refrigerant circuit of the vapor compression system and providing cooling to the power control system; and
    valves for adjusting flow through the refrigerant cooling lines.

9. The refrigerant system of claim 1 wherein:
    the variable speed device comprises:
        a first variable frequency drive connected to the compressor motor; and
        a second variable frequency drive connected to the at least one of said condenser fan motor, said evaporator fan motor, said condenser pump motor and said evaporator pump motor; and
    the bypass device comprises:
        a first switch positioned between the compressor motor and the first variable frequency device; and
        a second switch positioned between the at least one of said condenser fan motor, said evaporator fan motor, said condenser pump motor and said evaporator pump motor, and the second variable frequency device;
    wherein the controller operates the first switch to bypass the first variable frequency drive based at least in part on efficiency of running the compressor motor at line frequency as compared to operating at a speed other than provided by line frequency where there are additional inverter losses; and
    wherein the controller operates the second switch to bypass the second variable frequency drive based at least in part on efficiency of running the at least one of said condenser fan motor, said evaporator fan motor, said condenser pump motor and said evaporator pump motor at line frequency as compared to operating at a speed other than provided by line frequency where there are additional inverter losses.

10. A method of operating a refrigerant system to meet a conditioned space thermal load comprising:
    providing a vapor compression system having an electric compressor motor and an electric component motor, wherein the electric component motor drives at least one of a condenser fan, a condenser pump, an evaporator fan, an evaporator pump;
    determining if said electric compressor motor and electric component motor are to be run at speeds different from a normal operating speed to satisfy the conditioned space thermal load;
    adjusting speeds of said electric compressor motor and electric component motor to satisfy the conditioned space thermal load, wherein said speeds are adjusted by a variable speed device;

providing power to said electric compressor motor and electric component motor by bypassing said variable speed device if the space conditioning load can be satisfied by running said electric component motor and electric component motor at said normal operating speed; and monitoring operational parameters of the refrigerant system and bypassing said variable speed device based at least in art on a controller comparing efficiency of running at line frequency to operating at a speed other than provided by line frequency where there are additional inverter losses.

11. The method of claim 10, further comprising:

monitoring said operational parameters of the refrigerant system via at least one transducer that is selected from a group consisting of temperature transducer, pressure transducer, current transducer, power transducer, torque transducer, slip transducer or any combination thereof.

12. The method of operating a refrigerant system of claim 10, further comprising:

providing cooling to the variable speed device with refrigerant from the vapor compression system.

* * * * *